US012247709B2

(12) United States Patent
Liang

(10) Patent No.: US 12,247,709 B2
(45) Date of Patent: Mar. 11, 2025

(54) LAMP BULB STRUCTURE AND LAMP

(71) Applicant: Nanning City Hong Cai Illuminations Technology Company Limited, Guangxi (CN)

(72) Inventor: Faquan Liang, Nanning (CN)

(73) Assignee: Nanning City Hong Cai Illuminations Technology Company Limited, Nanning (CN)

( * ) Notice: Subject to any disclaimer, the term of this patent is extended or adjusted under 35 U.S.C. 154(b) by 0 days.

(21) Appl. No.: 18/210,666

(22) Filed: Jun. 16, 2023

(65) Prior Publication Data

US 2024/0401755 A1 Dec. 5, 2024

(30) Foreign Application Priority Data

May 30, 2023 (CN) ......................... 202321352408.6

(51) Int. Cl.

| | |
|---|---|
| ***F21K 9/238*** | (2016.01) |
| ***F21K 9/232*** | (2016.01) |
| ***F21V 19/00*** | (2006.01) |
| ***F21V 31/00*** | (2006.01) |
| *F21Y 115/10* | (2016.01) |

(52) U.S. Cl.

CPC .............. *F21K 9/232* (2016.08); *F21K 9/238* (2016.08); *F21V 19/0025* (2013.01); *F21V 31/005* (2013.01); *F21Y 2115/10* (2016.08)

(58) Field of Classification Search

CPC .......... F21K 9/238; F21K 9/232; F21K 9/235; F21K 9/237; F21V 19/0025; F21V 31/005; F21V 23/06; F21V 17/12; F21V 17/10; F21V 19/003; F21V 19/0055; F21V 19/005; F21V 19/0045; F21V 19/004; F21V 19/0035; F21V 31/04; F21Y 2115/10; F21Y 2103/10; F21S 4/28

See application file for complete search history.

(56) References Cited

U.S. PATENT DOCUMENTS 11,293,596 B1 * 4/2022 Wang ...................... F21K 9/238
11,346,509 B1 * 5/2022 Wu ....................... F21V 31/005

FOREIGN PATENT DOCUMENTS

CN 108882434 A * 11/2018 ............. H05B 45/37

OTHER PUBLICATIONS

Search English translation of CN 108882434 A (Year: 2018).*

* cited by examiner

*Primary Examiner* — Omar Rojas Cadima

(57) ABSTRACT

The present disclosure provides a lamp bulb structure and a lamp with the same. The lamp bulb structure includes a lamp housing, a lamp head, a connection base and a wick assembly mounted on the connection base and electrically connected to the lamp head, the lamp housing includes a lighting part having a lighting cavity and a connecting portion having an annular opening communicating with the lighting cavity; the connection base includes a first connecting member and a second connecting member; the first connecting member is inserted in the annular opening by interference fit, and the first connecting member forms a recess having an opening facing away from the lighting cavity; the second connecting member is inserted in the recess by interference fit; the lamp head is sleeved on an outer wall of the connecting portion and covers the annular opening.

14 Claims, 3 Drawing Sheets

LAMP BULB STRUCTURE AND LAMP

CROSS REFERENCE TO RELATED APPLICATIONS

The present application claims the benefit of Chinese Patent Application No. 202321352408.6 filed on May 30, 2023, the contents of which are incorporated herein by reference in their entirety.

TECHNICAL FIELD

The present disclosure relates to lamp bulb structures, and more particularly, to a lamp bulb structure and a lamp with the same.

BACKGROUND

At present, there are mainly two types of lamp bulb structures. One type of lamp bulb structure has a pressing type of fixed circuit, but the lamp bulb structure is complex and requires many assembly processes, resulting in high production and assembly costs; the other type of lamp bulb structure has a wick structure with a sealant seat for waterproof sealing, but the waterproof effect and the applicability of the sealant seat are poor, resulting in high manufacturing costs. Therefore, there is still a lot of room for improvement in the manufacturing method of the current lamp bulbs.

SUMMARY OF THE DISCLOSURE

The present disclosure provides a lamp bulb structure and a lamp with the same, aiming to solve the problems of the present lamp bulb structures such as complex structure and high manufacturing cost.

In view of the above technical problems, the embodiment of the present provides a lamp bulb structure, including a lamp housing, a lamp head, a connection base and a wick assembly mounted on the connection base and electrically connected to the lamp head, the lamp housing includes a lighting part having a lighting cavity and a connecting portion having an annular opening communicating with the lighting cavity; the connection base includes a first connecting member and a second connecting member; the first connecting member is inserted in the annular opening by interference fit, and the first connecting member forms a recess having an opening facing away from the lighting cavity; the second connecting member is inserted in the recess by interference fit; the lamp head is sleeved on an outer wall of the connecting portion and covers the annular opening.

In an embodiment, a sealing slot for filling with sealant is formed by ends of the first connecting member and the second connecting member away from the lighting cavity and an inner wall of the annular opening.

In an embodiment, the ends of the first connecting member and the second connecting member away from the lighting cavity are coplanar with each other.

In an embodiment, the connecting portion includes an inner support portion and an inner support ring arranged on the inner wall of the annular opening, and an outer support portion and an outer support ring arranged on the outer wall of the connecting portion; the first connecting member is inserted in the annular opening and is connected to the inner support portion by interference fit; the lamp head is connected to the outer support portion by interference fit.

In an embodiment, the first connecting member includes a support portion and an annular holder connected to one end of the support portion facing away from the lighting cavity; the support portion is inserted into the annular opening and is connected to the inner support portion by interference fit; the annular holder is used to abut the inner support ring or the outer support ring after the support portion is inserted into the annular opening.

In an embodiment, a first guiding portion for guiding the first connecting member to be inserted into the annular opening is arranged on one end of the first connecting member facing away from the opening of the recess; and/or a second guiding portion for guiding the second connecting member to be inserted into the recess is arranged on one end of the second connecting member closer to the lighting cavity.

In an embodiment, the lamp head includes a first electrode and a second electrode; the wick assembly includes a light source assembly mounted on the first connecting member and located in the lighting cavity, a first line electrically connected between the first electrode and a first end of the light source assembly, and a second line electrically connected between the second electrode and a second end of the light source assembly.

In an embodiment, the first connecting member defines a first through hole and a second through hole connected between the recess and the lighting cavity; one end of the first line is electrically connected to the first end of the light source assembly by passing through the first through hole and the other end of the first line is electrically connected to the first electrode; one end of the second line is electrically connected to the second end of the light source assembly by passing through the second through hole and the other end of the second line is electrically connected to the second electrode.

In an embodiment, the first line includes a first electronic element, a first wire electrically connected between the first electronic element and the first end of the light source assembly, and a second wire electrically connected between the first electronic element and the first electrode; the second line includes a second electronic element, a third wire electrically connected between the second electronic element and the second end of the light source assembly, and a fourth wire electrically connected between the second electronic element and the second electrode; the first electronic element is a resistive element or a constant current element or a metal wire; the second electronic element is a resistive element, a constant current element, or a metal wire; and/or the light source assembly is a filament type of LED light source assembly or a flat type of LED light source assembly.

The present disclosure further provides a lamp including the above lamp bulb structure.

The lamp bulb structure of the present disclosure includes the lamp housing, the lamp head, the connection base and the wick assembly mounted on the connection base and electrically connected to the lamp head; the lamp housing includes the lighting part having the lighting cavity and the connecting portion having the annular opening communicating with the lighting cavity; the connection base includes the first connecting member and the second connecting member; the first connecting member is inserted in the annular opening by interference fit, and the first connecting member forms a recess having an opening facing away from the lighting cavity; the second connecting member is inserted in the recess by interference fit; the lamp head is sleeved on an outer wall of the connecting portion and covers the annular opening. In the lamp bulb structure provided in the present disclosure, the first connecting member is inserted in the annular opening by interference fit and the second connecting member is inserted in the recess by interference fit, thus, the wick assembly, the lamp head, and lamp housing can be assembled together by the first connecting member and the second connecting member, which has a simple structure and a simple assembly process. Meanwhile, the lamp head is sleeved on the outer wall of the annular opening and covers the annular opening, and the first connecting member is inserted in the annular opening by interference fit to seal the annular opening, in this way, all components inside the lamp housing and the lamp head can be protected, thus prolonging the product life and allowing the lamp bulb to be more environmentally friendly. The overall structure of the lamp bulb structure of the present disclosure is simple and reasonable and the assembly method is fast, which reduces the production cost; in addition, the lamp head, the lamp housing and the connection base are connected by mutual fit, which allows the lamp bulb structure to be stable; furthermore, the above-mentioned components can be quickly assembled into finished products, which improves production efficiency and reducing production costs of the lamp bulb structure.

BRIEF DESCRIPTION OF THE DRAWINGS

The present disclosure will now be further illustrated with the attached drawings and following embodiments.

Figure 1:
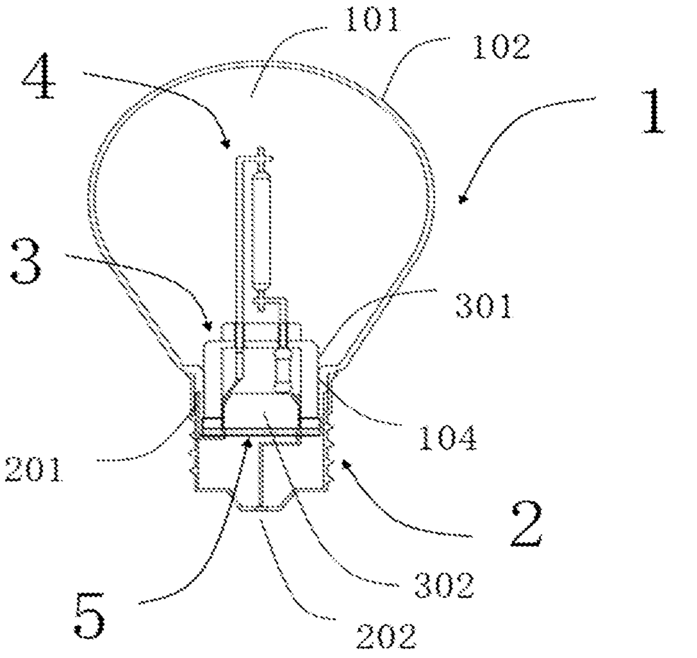
FIG. 1 is a schematic diagram of a lamp bulb structure in accordance with an embodiment of the present disclosure.

The accompanying drawings in the instruction manual are marked as follows:

1—lamp housing, 101—lighting cavity, 102—lighting part, 103—annular opening, 104—connecting portion, 1041—inner support portion, 1042—outer support portion, 1043—inner support ring, 1044—outer support ring. 2—lamp head, 201—first electrode, 202—second electrode, 3—connection base, 301—first connecting member, 3010—recess 3011—support portion, 3012—annular holder, 3013—first guiding portion, 3014—first through hole, 3015—second through hole, 302—second connecting member, 3020—second guiding portion, 4—wick assembly, 401—light source assembly, 402—first line, 403—second line, 4030—first electronic element, 4031—first wire 4032—second wire, 4033—third wire, 4034—fourth wire, 4035—second electronic element, 5—scaling slot.

PREFERRED EMBODIMENTS

In the following, the technical solutions in the embodiments of the present disclosure will be clearly and completely described with reference to the drawings in the embodiments of the present disclosure. Obviously, the described embodiments may be only a part of the embodiments of the present disclosure, but not all of the embodiments. Based on the embodiments of the present disclosure, all other embodiments obtained by those of ordinary skilled in the art without creative effort shall fall within the protection scope of the present disclosure.

In the description of the present utility model, it should be understood that orientations or positional relationships indicated by terms such as "upper", "lower", "left", "right", "front", "rear", and "middle" are orientations or positional relationships shown based on the figures, and the terms are merely for convenience of describing the present utility model and for simplifying the description, but for indicating or implying that an indicated apparatus or element must have a specific orientation, and must be constructed and operated in a specific orientation, which thus may not be understood as limiting the present utility model.

As shown in FIGS. 1 to 6, an embodiment of the present disclosure provides a lamp bulb structure including a lamp housing 1, a lamp head 2, a connection base 3, and a wick assembly 4 mounted on the connection base 3 and electrically connected to the lamp head 2. The lamp housing 1 includes a lighting part 102 having a lighting cavity 101 and a connecting portion 104 communicating with an annular opening 103 of the lighting cavity 101. The connection base 3 includes a first connecting member 301 and a second connecting member 302; the first connecting member 301 is inserted in the annular opening 103 by interference fit, and the first connecting member 301 forms a recess 3010 with an opening facing away from the lighting cavity 101. The second connecting member 302 is inserted in the recess 3010 by interference fit. The lamp bulb structure can be assembled in such a way that firstly the wick assembly 4 is installed and fixed into the recess 3010 of the connection base 3, the second connecting member 302 is then inserted in the recess 3010 by interference fit; after that, the first connecting member 301 is inserted in the annular opening 103 by interference fit so that the wick assembly 4 is located in the lighting cavity 101, and finally the lamp head 2 is sleeved on an outer wall of the connecting portion 104 and covers the annular opening 103. At this time, the quick assembly between the connection base 3, the lamp head 2 and the lamp housing 1 is completed. Understandably, the sequence of the above assembly process can be adjusted according to actual needs.

In the present disclosure, the first connecting member 301 and the second connecting member 302 can be made of insulating plastic or rubber. In this embodiment, the second connecting member 302 can have a solid body structure or a hollow body structure; if the second connecting member 302 has a hollow body structure, not only can material be saved, but also the weight of the entire lamp bulb structure can be reduced.

In the lamp bulb structure of the above embodiment of the present disclosure, the wick assembly 4, the lamp head 2 and the lamp housing 1 are assembled by the first connecting member 301 and the second connecting member 302, thus, the lamp blub structure is simple and the assembly of the lamp bulb structure is easy. Meanwhile, the lamp head 2 is sleeved on the outer wall of the annular opening 103 of the lamp housing 1 and covers the annular opening 103, and the first connecting member 301 is inserted in the annular opening 103 by interference fit to seal the annular opening 103; in this way, all components inside the lamp housing 1 and the lamp head 2 can be protected, thus prolonging the service life of the lamp bulb structure and allowing the lamp bulb structure to be more environmentally friendly. The lamp bulb structure of the present disclosure is simple and reasonable and the assembly of the lamp bulb structure is quick, which reduces the production cost; in addition, the lamp head 2, the lamp housing 1 and the connection base 3 are connected by mutual fit, which allows the lamp bulb structure to be stable; furthermore, the above-mentioned components can be quickly assembled into finished products, which improves production efficiency and reducing production costs.

Figure 2:
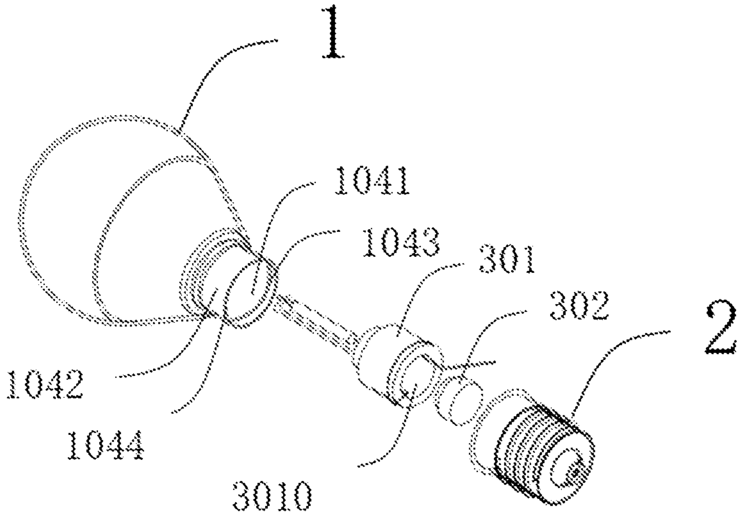
FIG. 2 is an exploded diagram of the lamp bulb structure in accordance with an embodiment of the present disclosure.

In one embodiment, referring to FIGS. 1 and 2, a sealing slot 5 in which sealant is filled is formed by ends of the first connecting member 301 and the second connecting member 302 which are away from the annular opening 103 and an inner wall of the annular opening 103. When the first connecting member 301 is inserted in the annular opening 103 by interference fit and the second connecting member 302 is inserted in the annular opening 103 by interference fit, a space, that is the sealing slot 5, is formed between the corresponding end of the first connecting member 301 and the inner wall of the annular opening 103. After the sealing slot 5 is filled with sealant, the wick assembly 4 mounted on the connection base 3 can be prevented from contacting external water, thus, the sealing slot 5 can play the role of sealing protection such that external water can not enter the recess 3010 and the lighting cavity 101, thus, the lamp bulb structure can have a good waterproof effect and the service life of the lamp bulb structure can be prolonged.

In an embodiment, surfaces of the ends of the first connecting member 301 and the second connecting member 302 which are away from the lighting cavity 101 are coplanar with each other. Referring to FIGS. 1 and 2, the ends of the first connecting member 301 and the second connecting member 302 are respectively at a certain distance from an opening edge of the annular opening 103, that is, a depth of the sealing slot 5 is equal to the distance, and if the surfaces of the ends of the first connecting member 301 and the second connecting member 302 which are away from the light cavity 101 are coplanar with each other, a bottom of the scaling slot 5 is flat to facilitate the filling of the sealant.

In other embodiments, on the basis that the space between the inner wall of the annular opening 103 and the ends of the first connecting member 301 and the second connecting member 302 which are away from the lighting cavity 101 can be filled with sealant, the surfaces of the ends of the first connecting member 301 and the second connecting member 302 which are away from the lighting cavity 101 may not be coplanar with each other. Understandably, in some embodiments, the space can be fully filled with the sealant such that the ends of the first connecting member 301 and the second connecting member 302 away from the lighting cavity 101 are coplanar with the opening edge of the annular opening 103; in other embodiments, the space can be partly filled with sealant such that a gap in the space is left unfilled with sealant.

Figure 4:
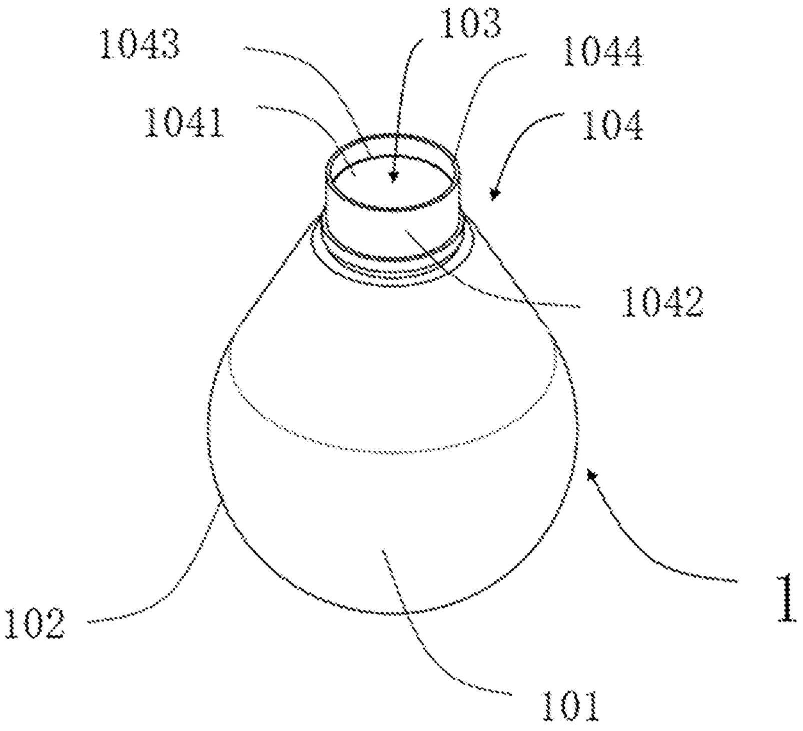
FIG. 4 is a schematic diagram of a lamp housing of the lamp bulb structure in accordance with an embodiment of the present disclosure.

In an embodiment, referring to FIGS. 1, 2 and 4, the connecting portion 104 includes an inner support portion 1041 and an inner support ring 1043 arranged on the inner wall of the annular opening 103, and an outer support portion 1042 and an outer support ring 1044 arranged on an outer wall of the connecting portion 104. The first connecting member 301 is inserted in the annular opening 103 and is connected to the inner support portion 1041 by interference fit; the lamp head 2 is connected to the outer support portion 1042 by interference fit. In this embodiment, the outer support portion 1042 and the inner support portion 1041 are integrally formed; understandably, the connection between the connection base 3 and the lamp head 2 can be completed by inserting the first connecting member 301 in the annular opening 103 and connecting the first connecting member 302 to the inner support portion 1041 by interference fit, and the connection between the lamp head 2 and the lamp housing 1 can be completed by connecting the lamp head 2 to the outer support portion 1042 by interference fit.

In an embodiment, referring to FIGS. 1 to 4, the first connecting member 301 includes a support portion 3011 and an annular holder 3012 connected to one end of the support portion 3011 facing away from the lighting cavity 101. The support portion 3011 is inserted into the annular opening 103 and is connected to the inner support portion 1041 by interference fit, such that the support portion 3011 is clamped and fixed into the inner support portion 1041. The annular holder 3012 is used to abut the inner support ring 1043 after the support portion 3011 is inserted into the annular opening 103 to provide a secure connection. In another embodiment, the support portion 3011 can be clamped and fixed in the inner support portion 1041; and the annular holder 3012 can be used to abut the outer support ring 1044 after the support portion 3011 is inserted into the annular opening 103 to limit the insertion depth of the support portion 3011.

Figure 3:
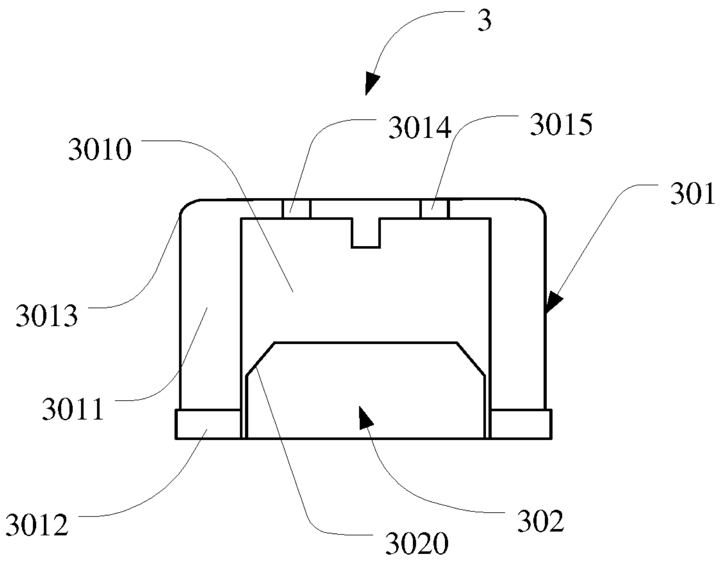
FIG. 3 is a schematic diagram of a connection base of the lamp bulb structure in accordance with an embodiment of the present disclosure.

Preferably, referring to FIG. 3, a first guiding portion 3013 for guiding the first connecting member 301 to be inserted into the annular opening 103 is arranged on one end of the first connecting member 301 away from the opening of the recess 3010, and a second guiding portion 3020 for guiding the second connecting member 302 to be inserted into the recess 3010 is arranged on one end of the second connecting member 302 closer to the lighting cavity 101. That is, the first guiding portion 3013 is capable of guiding the first connecting member 301 to be inserted into the annular opening 103, such that the first connecting member 301 can be smoothly guided into the annular opening 103; the second guiding portion 3020 is capable of guiding the second connecting member 302 to be inserted into the recess 3010, such that the second connecting member 302 can be smoothly guided into the recess 3010.

Figure 5:
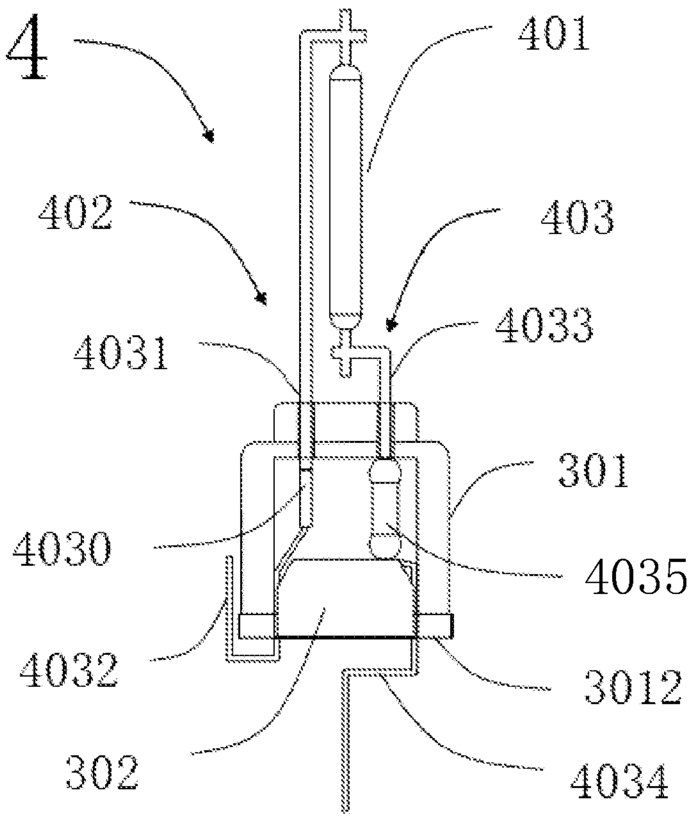
FIG. 5 is a schematic diagram of a light source assembly in the lamp bulb structure in accordance with an embodiment of the present disclosure when the light source assembly is a filament type of LED light source assembly.

In an embodiment, referring to FIGS. 1 and 5, the lamp head 2 includes a first electrode 201 and a second electrode 202. The wick assembly 4 includes a light source assembly 401 mounted on the first connecting member 301 and located in the lighting cavity 101, a first line 402 electrically connected between the first electrode 201 and a first end of the light source assembly 401, and a second line 403 electrically connected between the first electrode 202 and a second end of the light source assembly 401. Understandably, the first electrode 201, the first line 402, the first end of the light source assembly 401, the second line 403, and the second electrode 202 in turn forms a circuit of the wick assembly 4, which operates when an external power supply of the lamp bulb structure is connected to the wick assembly 4 through the lamp head 2. When the wick assembly 4 works, the light source assembly 401 emits light in the lighting space to provide illumination to the outside world.

Furthermore, referring to FIGS. 1 and 4, the first connecting member 301 defines a first through hole 3014 and a second through hole 3015 connected between the recess 3010 and the lighting cavity 101. One end of the first line 402 is electrically connected to the first end of the light source assembly 401 by passing through the first through hole 3014, and the other end of the first line 402 is electrically connected to the first electrode 201 of the lamp head 2. One end of the second line 403 is electrically connected to the second end of the light source assembly 401 by passing through the second through hole 3015, and the other end of the second line 403 is connected to the second electrode 202 of the lamp head 2. That is, one end of the first line 402 passes through the first through hole 3014 and is electrically connected to the first end of the light source assembly 401, and the other end thereof is electrically connected to the first electrode 201 of the lamp head 2; one end of the second line 403 passes through the second through hole 3015 and is electrically connected to the second end of the light source assembly 401, and the other end thereof is connected to the second electrode 202 of the lamp head 2. The first through hole 3014 and the second through hole 3015 are directly defined in a top wall of the support portion 3011 of the first connecting member 301, making reasonable use of the space of the connection base 3 and providing a compact structure. Preferably, the first through hole 3014 and the second through hole 3015 can both be circular through holes or square through holes.

Figure 6:
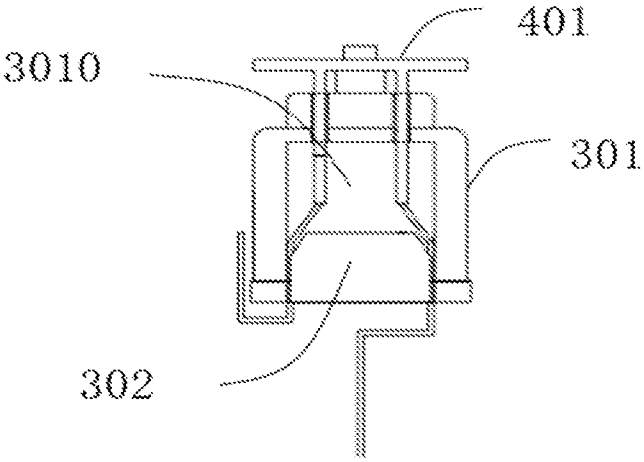
FIG. 6 is a schematic diagram of the light source assembly in the lamp bulb structure in accordance with an embodiment of the present disclosure when the light source assembly is a flat type of LED light source assembly.

In one embodiment, referring to FIGS. 1 and 5, the first line 402 includes a first electronic element 4030, a first wire electrically connected between the first electronic element 4030 and the first end of the light source assembly 401, and a second wire 4032 electrically connected between the first electronic element 4030 and the first electrode 201. The second line 403 includes a second electronic element 4035, a third wire 4033 electrically connected between the second electronic element 4035 and the second end of the light source assembly 401, and a fourth wire 4034 electrically connected between the second electronic element 4035 and the second electrode 202. In this embodiment, the first electronic element 4030 in the first line 402 and the second electronic element 4035 in the second line 403 are mounted in the recess 3010 and are located on the top wall of the second connecting member 302, and the second connecting member 302 is connected with the first connecting member 301 by interference fit, which supports and fastens the first line 402 and the second line 403. Preferably, the first electronic element 4030 includes, but is not limited to, a resistive element, a constant current element, or a metal wire; the second electronic element 4035 includes, but is not limited to, a resistive element, a constant current element, or a metal wire. As shown in FIGS. 5 and 6, the light source assembly 401 can be a filament type of LED light source assembly or a flat type of LED light source assembly.

The present disclosure also provides a lamp, with reference to FIGS. 1 to 6, including the lamp bulb structure described above, the light source assembly 401 of the lamp bulb structure may be a filament type of LED light source assembly or a flat type of LED light source assembly. In the lamp of the above embodiment of the present disclosure, the lamp bulb structure is simple and the assembly of the lamp bulb structure is by assembling the wick assembly 4, the lamp head 2 and the lamp housing 1 through the first connecting member 301 and the second connecting member 302; meanwhile, the lamp head 2 is sleeved on the outer wall of the annular opening 103 of the lamp housing 1 and covers the annular opening 103, while the first connecting member 301 is inserted in the annular opening 103 by interference fit to seal the annular opening 103. In this way, all the components inside the lamp housing 1 and the lamp head 2 can be protected, thus prolonging the service life of the lamp bulb structure and allowing the lamp bulb structure to be more environmentally friendly. The lamp bulb structure of the present disclosure is simple and reasonable and the assembly of the lamp bulb structure is quick, which reduces the production cost; in addition, the lamp head 2, the lamp housing 1 and the connection base 3 are connected by mutual fit, which allows the lamp bulb structure to be stable; furthermore, the above-mentioned components can be quickly assembled into finished products, which improves production efficiency and reducing production costs.

The above descriptions are only optional embodiments of the application, and do not limit the scope of the patents of the present application. All the equivalent structural transformations made by the content of the specification and drawings of the present application under the creative concept of the present application, or directly/indirectly used in other related technical fields are all comprised in the protection scope of the patents of the present application.

What is claimed is:

1. A lamp bulb structure, wherein the lamp bulb structure comprises a lamp housing, a lamp head, a connection base and a wick assembly mounted on the connection base and electrically connected to the lamp head, the lamp housing comprises a lighting part having a lighting cavity and a connecting portion having an annular opening communicating with the lighting cavity; the connection base comprises a first connecting member and a second connecting member; the first connecting member is inserted in the annular opening by interference fit, and the first connecting member forms a recess having an opening facing away from the lighting cavity; the second connecting member is inserted in the recess by interference fit; the lamp head is sleeved on an outer wall of the connecting portion and covers the annular opening;

characterized in that:

the connecting portion comprises an inner support portion and an inner support ring arranged on the inner wall of the annular opening, and an outer support portion and an outer support ring arranged on the outer wall of the connecting portion; the first connecting member is inserted in the annular opening and is connected to the inner support portion by interference fit; the lamp head is connected to the outer support portion by interference fit, and the first connecting member comprises a support portion and an annular holder connected to one end of the support portion facing away from the lighting cavity; the support portion is inserted into the annular opening and is connected to the inner support portion by interference fit; the annular holder is used to abut the inner support ring or the outer support ring after the support portion is inserted into the annular opening.

2. The lamp bulb structure according to claim 1, wherein a sealing slot for filling with sealant is formed by ends of the first connecting member and the second connecting member away from the lighting cavity and an inner wall of the annular opening.

3. The lamp bulb structure according to claim 2, wherein the ends of the first connecting member and the second connecting member away from the lighting cavity are coplanar with each other.

4. The lamp bulb structure according to claim 1, wherein a first guiding portion for guiding the first connecting member to be inserted into the annular opening is arranged on one end of the first connecting member facing away from the opening of the recess; and a second guiding portion for guiding the second connecting member to be inserted into the recess is arranged on one end of the second connecting member closer to the lighting cavity.

5. The lamp bulb structure according to claim 1, wherein the lamp head comprises a first electrode and a second electrode; the wick assembly comprises a light source assembly mounted on the first connecting member and located in the lighting cavity, a first line electrically connected between the first electrode and a first end of the light source assembly, and a second line electrically connected between the second electrode and a second end of the light source assembly.

6. The lamp bulb structure according to claim 5, wherein the first connecting member defines a first through hole and a second through hole connected between the recess and the lighting cavity; one end of the first line is electrically connected to the first end of the light source assembly by passing through the first through hole and the other end of the first line is electrically connected to the first electrode; one end of the second line is electrically connected to the second end of the light source assembly by passing through the second through hole and the other end of the second line is electrically connected to the second electrode.

7. The lamp bulb structure according to claim 5, wherein the first line comprises a first electronic element, a first wire electrically connected between the first electronic element and the first end of the light source assembly, and a second wire electrically connected between the first electronic element and the first electrode; the second line comprises a second electronic element, a third wire electrically connected between the second electronic element and the second end of the light source assembly, and a fourth wire electrically connected between the second electronic element and the second electrode; the first electronic element is a resistive element or a constant current element or a metal wire; the second electronic element is a resistive element, a constant current element, or a metal wire; and/or the light source assembly is a filament type of LED light source assembly or a flat type of LED light source assembly.

8. A lamp, wherein the lamp comprises a lamp bulb structure; the lamp bulb structure comprises a lamp housing, a lamp head, a connection base and a wick assembly mounted on the connection base and electrically connected to the lamp head, the lamp housing comprises a lighting part having a lighting cavity and a connecting portion having an annular opening communicating with the lighting cavity; the connection base comprises a first connecting member and a second connecting member; the first connecting member is inserted in the annular opening by interference fit, and the first connecting member forms a recess having an opening facing away from the lighting cavity; the second connecting member is inserted in the recess by interference fit; the lamp head is sleeved on an outer wall of the connecting portion and covers the annular opening;

characterized in that:

the connecting portion comprises an inner support portion and an inner support ring arranged on the inner wall of the annular opening, and an outer support portion and an outer support ring arranged on the outer wall of the connecting portion; the first connecting member is inserted in the annular opening and is connected to the inner support portion by interference fit; the lamp head is connected to the outer support portion by interference fit, and the first connecting member comprises a support portion and an annular holder connected to one end of the support portion facing away from the lighting cavity; the support portion is inserted into the annular opening and is connected to the inner support portion by interference fit; the annular holder is used to abut the inner support ring or the outer support ring after the support portion is inserted into the annular opening.

9. The lamp according to claim 8, wherein a sealing slot for filling with sealant is formed by ends of the first connecting member and the second connecting member away from the lighting cavity and an inner wall of the annular opening.

10. The lamp according to claim 9, wherein the ends of the first connecting member and the second connecting member away from the lighting cavity are coplanar with each other.

11. The lamp according to claim 8, wherein a first guiding portion for guiding the first connecting member to be inserted into the annular opening is arranged on one end of the first connecting member facing away from the opening of the recess; and a second guiding portion for guiding the second connecting member to be inserted into the recess is arranged on one end of the second connecting member closer to the lighting cavity.

12. The lamp according to claim 8, wherein the lamp head comprises a first electrode and a second electrode; the wick assembly comprises a light source assembly mounted on the first connecting member and located in the lighting cavity, a first line electrically connected between the first electrode and a first end of the light source assembly, and a second line electrically connected between the second electrode and a second end of the light source assembly.

13. The lamp according to claim 12, wherein the first connecting member defines a first through hole and a second through hole connected between the recess and the lighting cavity; one end of the first line is electrically connected to the first end of the light source assembly by passing through the first through hole and the other end of the first line is electrically connected to the first electrode; one end of the second line is electrically connected to the second end of the light source assembly by passing through the second through hole and the other end of the second line is electrically connected to the second electrode.

14. The lamp according to claim 12, wherein the first line comprises a first electronic element, a first wire electrically connected between the first electronic element and the first end of the light source assembly, and a second wire electrically connected between the first electronic element and the first electrode; the second line comprises a second electronic element, a third wire electrically connected between the second electronic element and the second end of the light source assembly, and a fourth wire electrically connected between the second electronic element and the second electrode; the first electronic element is a resistive element or a constant current element or a metal wire; the second electronic element is a resistive element, a constant current element, or a metal wire; and/or the light source assembly is a filament type of LED light source assembly or a flat type of LED light source assembly.

* * * * *